United States Patent [19]

Ranganathan et al.

[11] Patent Number: 5,097,357
[45] Date of Patent: Mar. 17, 1992

[54] OPTICAL SWITCHING SYSTEM AND METHOD

[75] Inventors: Radha Ranganathan, N. Tonawanda, N.Y.; Michael Gal, Engadine, Australia; P. Craig Taylor, Salt Lake City, Utah

[73] Assignee: University of Utah, Salt Lake City, Utah

[21] Appl. No.: 367,536

[22] Filed: Jun. 15, 1989

[51] Int. Cl.$^5$ .............................................. G02F 1/01
[52] U.S. Cl. ................................ 359/243; 359/248; 357/2; 357/19
[58] Field of Search ................... 350/354, 96.13, 96.15, 350/362; 359/288, 247, 248, 243; 357/2, 19

[56] References Cited

U.S. PATENT DOCUMENTS

| | | | |
|---|---|---|---|
| 4,701,030 | 10/1987 | Jewell | 350/354 |
| 4,738,502 | 10/1988 | Mikami et al. | 350/354 X |
| 4,867,515 | 9/1989 | Normandin | 350/96.13 |

OTHER PUBLICATIONS

Ranganathan, R. et al., "Thermal Modulation of the Optical Properties of Amorphous Semiconducting Films," *Physical Review B*, vol. 37, No. 17, Jun. 15, 1988, pp. 10216–10220.

Hajto, J. and I. Janossy, "Optical Bistability Observed in Amorphous Semiconductor Films," *Philosophical Magazine B*, vol. 47, No. 4, pp. 347–366 (1983).

Miller, D. A. B., "Refractive Fabry Perot Bistability with Linear Absorption: Theory of Operation and Cavity Optimization," IEEE, vol. QE-17, No. 3 (1981), pp. 306–311.

Smith, S. D., "Optical Bistability, Photonic Logic and Optical Computation," *Applied Optics*, vol. 25, No. 10, pp. 1550–1564 (1986).

Amer, N. M. et al., "Optical Properties of Defect States in G—Si:H", *Semiconductors and Semimetals*, vol. 21, Part B, Academic Press, NY (1984) pp. 83–112.

Brodsky, M. H. and P. A. Leary, "The Temperature Dependence of the Refractive Index of Hydrogerated Amorphous Silicon and Implications for Electraeflectance Experiments," *J. Non-Cryst. Solids* 35 and 36 (1980) pp. 487–492.

Hecht, E., A. Zajac, Article 9.8, "The Fabry-Perot Interferometer", *Optics*, 4th Ed., 1979, pp. 307–311.

*Primary Examiner*—Rolf Hille
*Assistant Examiner*—Roy Potter
*Attorney, Agent, or Firm*—Trask, Britt & Rossa

[57] ABSTRACT

An optically bistable device is disclosed. The device includes a uniformly thick layer of amorphous silicon to constitute a Fabry-Perot chamber positioned to provide a target area for a probe beam. The probe beam has a maximum energy less than the energy band gap of the amorphous semiconductor. In a preferred embodiment, a multilayer dielectric mirror is positioned on the Fabry-Perot chamber to increase the finesse of switching of the device. The index of refraction of the amorphous material is thermally altered to alter the transmission of the probe beam.

18 Claims, 7 Drawing Sheets

OPTICAL SWITCHING SYSTEM AND METHOD

This invention was made with government support under Grant Number DMR 8615217 awarded by the National Science Foundation and Grant Number XM-5-05009-2 awarded by the Solar Energy Research Institute. The government has certain rights in the invention subject to the provisions of 37 C.F.R. §401 and 45 C.F.R. §8.

BACKGROUND OF THE INVENTION

1. Field

The present invention is directed toward an optically bistable system and method that incorporates amorphous semiconductor material in an optical feedback cavity. The amorphous material may be thermally altered by electromagnetic radiation to alter the transmission or reflection of a probe beam.

2. State of the Art

There has been an "invasion" of optical devices and methods into traditional electronics-based communications and computing fields. This invasion has occurred in areas such as individual optical logic devices, interconnections in optical communications, and novel all-optical computer architecture. A device used in such applications is the optically bistable device. A system is said to be optically bistable when it can exhibit two different optical output signals for a single optical input signal.

Optical bistability occurs as a result of nonlinearity in light/matter interactions. Nonlinearity in the material can occur because of optical absorption by the material or a change in the refractive index. In absorptive optical bistability, an increase in input power may result in an increase or a decrease in absorption, i.e., the optical medium becomes less or more transparent as more light is shined onto it. Optical bistability is described in S. D. Smith, *Applied Optics*, infra, the disclosure of which is incorporated herein by this reference.

In crystalline semiconductors, optical bistability can be achieved by a thermal shift of the energy band gap of the material, which results in light being absorbed. A number of optically bistable devices which utilize crystalline semiconductor materials have been discussed in the literature. Three materials which have been investigated are: GaAs, InSb, and ZnSe. (S. D. Smith: "Optical Bistability, Photonic Logic and Optical Computation," *Applied Optics.* Vol. 25, No. 10, page 1550 (1986)). However, while these crystalline materials show large optical bistability, they are limited in the spectral range of electromagnetic radiation to which they will respond, the temperature at which they will properly function (particularly InSb), and feasibility in terms of large-scale production and use in practical applications.

In amorphous (conventionally designated "a-") semiconducting films, it has been postulated that electronic, thermal, and photostructural (laser-induced structural changes) act simultaneously to produce nonlinear behavior in some cases. (J. Hajto and I. Janossy, "Optical Bistability Observed in Amorphous Semiconductor Films," *Philos. Mag.*, 47, 347 (1983)). In a-GeSe$_2$ films, thermal effects have been considered as one of the causes for optical bistability in the Urbach region of the absorption edge, where the absorption coefficient $\alpha$ is temperature dependent. Id. The temperature dependence of the refractive index of hydrogenated amorphous silicon (a-Si:H) has been measured and the modulated thermoreflectance has been calculated. (M. H. Brodsky and P. A. Leary, J. Non-cryst. Solids 35 and 36, 487 (1980)).

SUMMARY OF THE INVENTION

An optical switching system of the invention is provided. This system involves a probe beam of electromagnetic radiation. A film of amorphous semiconductor material is positioned such that the probe beam is incident upon a target area of the amorphous semiconductor. The film is configured and adapted to provide optical feedback to the probe beam and to reflect or transmit the probe beam. The probe beam is of an energy less than the energy band gap of the amorphous semiconductor. A pump beam of electromagnetic radiation is positioned incident upon the target area. The pump beam is of a preselected energy to thermally alter the amorphous semiconductor material a sufficient amount to alter the transmission or reflection of the probe beam.

In a preferred embodiment, internally reflective mirrors are positioned on the amorphous semiconductor material. These internally reflective mirrors are preferably multilayer dielectric mirrors. In one embodiment, the probe beam and the pump beam are the same beam. In another embodiment, the pump beam and the probe beam are separate beams. In another preferred embodiment, the amorphous semiconductor material is amorphous silicon. In a highly preferred embodiment, the amorphous silicon is hydrogenated.

The invention also provides a method of altering the intensity of a transmitted probe beam. A layer of amorphous semiconductor is provided to have a target area. The target area is irradiated with the probe beam. The probe beam has an energy less than the energy band gap of the amorphous semiconductor. The probe beam is multiply internally reflected within the amorphous semiconductor layer and transmitted from the layer. The amorphous semiconductor material is thermally modulated to alter the intensity of transmission of the probe beam.

Amorphous semiconductor (particularly amorphous silicon) devices and associated methods of the invention present a number of advantages over currently available devices and methods. The wavelength of operation of a probe beam can be tuned to that of optical communications (generally 1.3 to 1.5 $\mu$m). Also, amorphous silicon (a-Si) and hydrogenated amorphous silicon (a-Si:H) can be manufactured in large and homogeneous films, which is advantageous for optical computing applications. In addition, technology relating to the manufacture of a-Si:H films is well developed. Therefore, the fabrication of these devices can easily be integrated into existing semiconductor device fabrication technologies.

DETAILED DESCRIPTION OF THE ILLUSTRATED EMBODIMENTS

Introduction

While actual mechanisms of the invention may be different than currently postulated, theoretical explanation set forth herein is currently believed to be consistent with the observed results, and is offered as an assistance to the practice of the invention defined by the appended claims.

Much of the theoretical and mathematical analysis of the following examples was set forth in a publication by the inventors: R. Ranganathan, M. Gal, and P. C. Taylor, *Thermal Modulation of the Optical Properties of Amorphous Semiconducting Films*, Physical Review B, Vol. 37, No. 17, June 15, 1988 (herein "Thermal Modulation article"). The disclosure of this article is incorporated herein by this reference.

The optical properties of a material may be mathematically represented by the energy-dependent complex index of refraction $n_c(E)=n(E)+ik(E)$. $n(E)$ is the energy-dependent real part and $k(E)$ is the energy-dependent imaginary part of the energy-dependent complex index. The imaginary part, $k(E)$, is related to a quantity referred to as the absorption coefficient $\lambda=4\pi k/\lambda$, where $\lambda$ is the wavelength. The absorption coefficient $\alpha$ relates to a characteristic width of material at which a majority of incident light is absorbed by the material.

According to band theory, semiconductors are characterized by wide continuous bands of electronic levels. The lower valence band is separated from the higher conduction band by an energy band gap $E_g$. In many semiconductor optical systems, it is assumed that modulated changes are electronically driven rather than being thermally generated. Within the meaning of the present specification, an electronic effect is one in which photons are absorbed, to produce a change in electronic energy states without significant heat being generated. For example, a photon may be absorbed to cause an electron to move from the valence band to the conduction band. These optically-induced changes are widely attributed to changes in the imaginary part of the complex index of refraction. A thermal effect, on the other hand, is one in which photons are converted ultimately into heat or vibrational kinetic energy of the atoms. These photons may be said to be ultimately converted into phonons.

In the following examples, the thermally modulated reflectivity and transmission of films of a-Si:H and As$_2$Se$_3$ on glass substrates are demonstrated. In these examples the modulation of the reflectivity or transmission is indicated to be primarily thermal in origin, rather than electronic, and as a result of the sensitive temperature dependence of the real part n of the index $n_c$. These examples also illustrate the effect of the modulation of n on the modulated transmission spectrum.

In the following examples, two effects are used to achieve optical bistability. One is nonlinearity of the index of refraction, and the second is optical feedback. A semiconducting film is deposited on a glass substrate. Multiple reflections at the interfaces of air/semiconductor, glass/semiconductor, and/or dielectric/semiconductor provide optical feedback. That is, because of a mismatch in the index of refraction at interfaces, a beam of radiation incident upon the film is multiply reflected within the film. The thin film may be considered a Fabry-Perot cavity or etalon, which is an optical device that provides for multiple internal reflections of a beam.

The Fabry-Perot cavity can be improved, or its "finesse" increased by positioning internally reflective mirrors on either side of the thin film, as discussed in reference to Examples 4 and 5. The thickness of the film and its index of refraction are chosen to correspond to the wavelength of the incident probe beam to provide destructive and constructive interference among components of the multiply-reflected beam. See E. Hecht, A. Zajac, *Optics*. 4th ed. 1979, Article 9.8, the disclosure of which is incorporated herein by this reference.

One use of optical nonlinearity is that one beam (a pump or bias beam) can modulate the optical properties of the optical medium and affect a second beam (a probe beam). This effect may be referred to as the optical transistor effect. Thus, the device may be used, for example, as an amplifier. A second use of optical nonlinearity is optical switching, in which an optically bistable device is caused to switch between two output states or intensities, representing, for example, a logic 0 or logic 1 condition in a logic device.

In the following examples, a change in the index of refraction produces a change in the intensity of both the transmitted and the reflected beam. Assuming absorption is negligible, when the transmitted beam is at its peak intensity, the reflected beam is at its lowest level, and vice versa. In the broad sense, the word transmission may be used to refer to either transmission or reflection. The result is that a change in the output beam (transmitted or reflected) occurs based upon altering of the index of refraction of the optical medium. Unless otherwise indicated by the context used in this specification, variants of the word transmit shall refer to both transmission and/or reflection.

EXAMPLE 1

Figure 1:
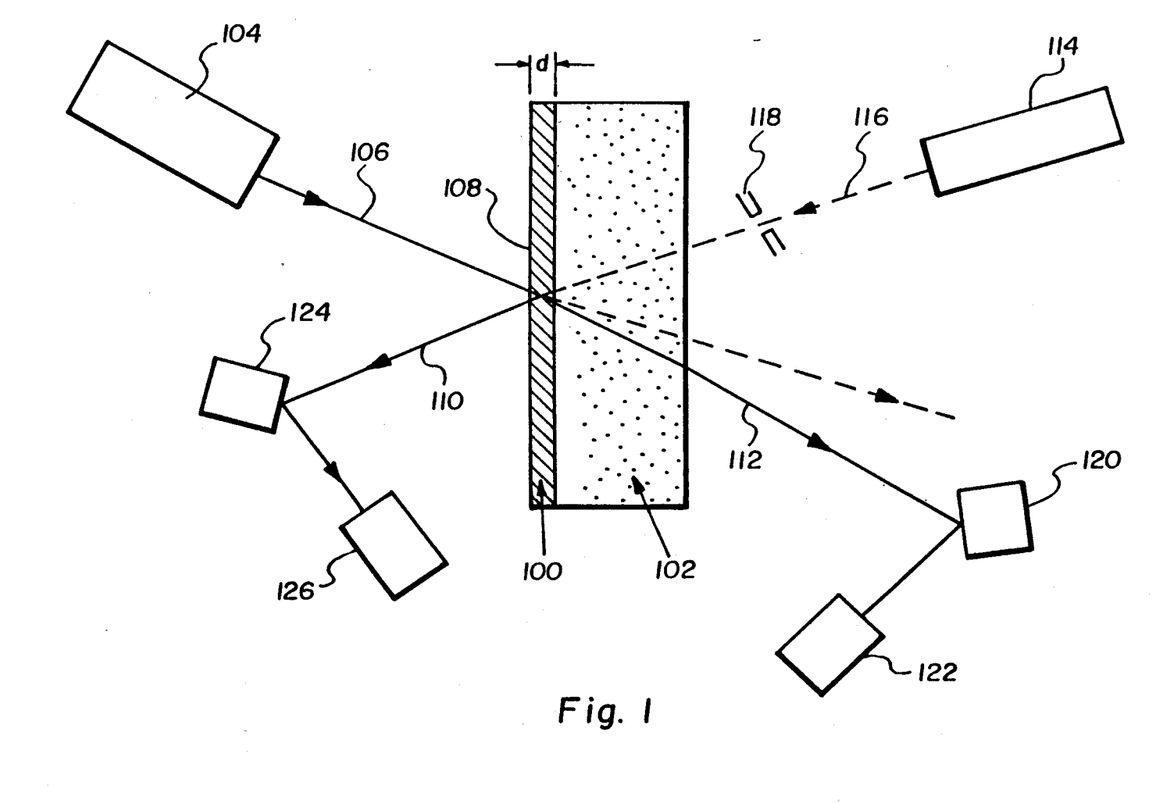
FIG. 1 is a schematic illustration of an optically bistable device of the invention (Examples 1, 2, 3 and 4)

Referring to FIG. 1, the illustrated optically bistable device of Example 1 included a thin film 100 of a-Si:H having thickness d on a glass substrate 102. A probe source 104 emitted a probe beam 106 upon region 108 of film 100. Thin film 100 constituted a Fabry-Perot cavity. Beam 106 reflected to beam 110 and transmitted to beam 112. Temperature modulation was accomplished by a pump source 114 which was a 5 watt Ar$^+$ cw laser producing a pump beam 116 (5145 Å) which was chopped by mechanical chopper 118 which may be adjusted to frequencies of between 10 Hz to 2 kHz. Beam 116 was incident on film 100. As a check, the region 108 illuminated by beam 116 was blackened with paint to separate thermal or temperature effects from electronic effects and to avoid any extraneous signal caused by luminescence in the low temperature measurements.

Probe source 104 was a broad band tungsten lamp. The refracted spectra were analyzed by a reflection grating 120 (0.75, μm) and detected with a photomultiplier tube 122 (either S1 or S20). An S1 photomultiplier tube is sensitive in the infrared region, and a S20 photomultiplier tube is sensitive in the visible range. Reflection spectra were taken from the substrate side by means of a similar grating 124 and photomultiplier tube 126. The modulated spectrum of beams 110 and 112 was measured using standard lock-in techniques.

The film 100 was deposited upon glass substrate 102 in a radio frequency (rf) glow discharge deposition system. Silane (SiH₄) gas was discharged into a radio-frequency electro-magnetic field to produce a plasma in the presence of the substrate 102. The deposition produced film 100 of a-Si:H having a hydrogen density of approximately 10 atomic percent, or approximately 1 hydrogen atom for every 10 silicon atoms.

Source 104 produces a broad spectral range of light, or white light. However, gratings 120 and 124 select only radiation at 0.75 μm or 7500 Å. This selected beam has an energy of approximately 1.65 electron volts (eV) Although source 104 produces a broad band of radiation, the radiation at 7500 Å is effectively the selected probe beam. Radiation at other wavelengths is essentially ignored.

Rather than selecting a frequency at the transmission or reflection side, the probe beam emanating from the source may be monochromatized. For example, a monochrometer may be positioned between broad band source 104 and film 100 to monochromatize beam 106 at 7500 Å. In such an arrangement, gratings 120 and 124 would be eliminated.

In a preferred commercial setting, source 104 would likely be a laser source, which would, of course, be monochromatic. For example, source 104 may be a GaAs laser, which is a laser widely used in communication fields. A GaAs laser beam has an energy of approximately 1.4 eV.

The energy band gap of a-Si:H film 100 is approximately 1.8 eV. Therefore, the energy of the selected probe beam 106 at 1.65 eV is lower than the energy band gap of the material. It is important that the selected probe beam have an energy lower than the energy band gap of the optical medium, since energy above the band gap would be unduly absorbed and would preclude the device from switching or amplifying properly.

Source 114 produces laser beam 116 at 5145 Å, or approximately 2.4 eV. Beam 116 is therefore in energy above the band gap of film 100. Beam 116 is used to alter or switch film 100 between its two bistable states.

However, as illustrated in Example 5, it is not necessary for the pump or biasing beam to be at an energy above the band gap of the film. The probe beam and the biasing beam may be the same beam. The energy band gap of amorphous semiconductors has a "tail" that leads into the recognized subgap region. In other words, it is possible for photons at energies lower than the band gap energy to be absorbed by electronic states in what would otherwise be considered a disallowed state—within the band gap itself—between the valence and conduction bands. Because of this band gap tail, absorption of electromagnetic radiation can occur at energies down to approximately one-half the band gap of the semiconductor. Therefore, in the film 100, absorption can occur at energies down to about 0.9 eV.

This band gap tail is widely attributed to defect states in the optical medium. The magnitude of this tail can be tuned by increasing or decreasing the number of defect states, for example, by increasing or decreasing the percentage of hydrogen atoms in the a-Si. Tuning of the band gap tail is described in N.M. Amer, W. E. Jackson, *Semiconductors and Semimetals*, Vol. 21B, Academic Press, N.Y. (1984). The article of this volume entitled "Optical Properties of Defect States in a Si:H," beginning on page 83, is incorporated herein by reference.

Figure 2:
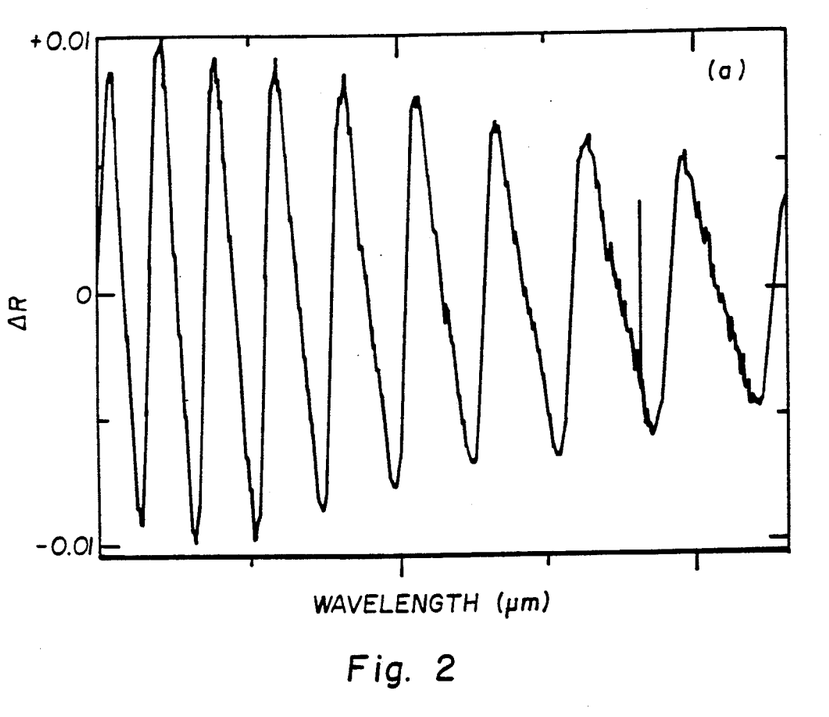
FIG. 2 is a graph of measured modulated reflectivity $\Delta R$ spectrum at 40 Hz and 300K of a 3 $\mu$m a-Si:H film on glass (Example 1)

FIG. 2 illustrates a typical room temperature spectrum of the modulated reflectivity, ΔR for a 3 μm thick film of a-Si:H on a glass substrate. The reflected signal of beam 110 remained unchanged on moving the modulating laser beam 116 to a region of the film 100 which was not blackened at the surface. This procedure illustrates that the effect was thermal and generated by the absorption of the pump beam in the film itself.

Figure 3:
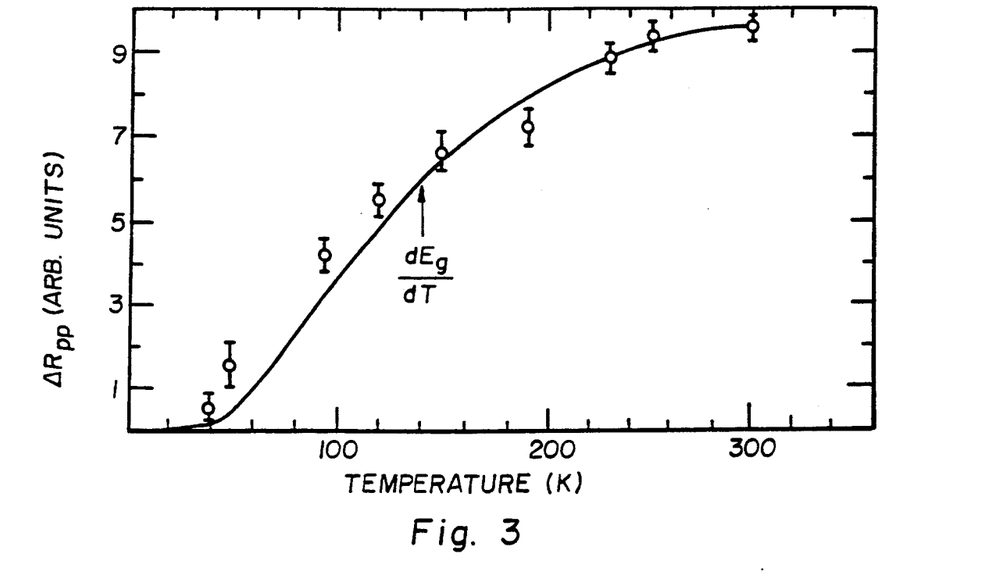
FIG. 3 is a graphical representation of measured temperature dependence of peak-to-peak amplitude of $\Delta R$ (Example 1)

FIG. 3 illustrates the temperature dependence of the peak-to-peak amplitude of ΔR of beam 110. The circles are data points for the average intensity of the pump or biasing beam 116. The average modulation intensity for the measurement of beam 110 was 70 mW/cm² and the modulation frequency was 40 Hz. The solid line $dE_g/dT$ was calculated from the expression $$E_g = E_g^\circ - \frac{0.220}{\exp(400/T) - 1}$$

where $E_g^\circ$ is the optical gap in eV at 0K. The good agreement between the observed results and the calculated curve indicates the presence of thermal modulation of n through a modulation of the band gap. (See Thermal Modulation article.) Similar results were obtained on thin films of glassy amorphous $As_2Se_3$, which is discussed in reference to Example 2.

Figure 4:
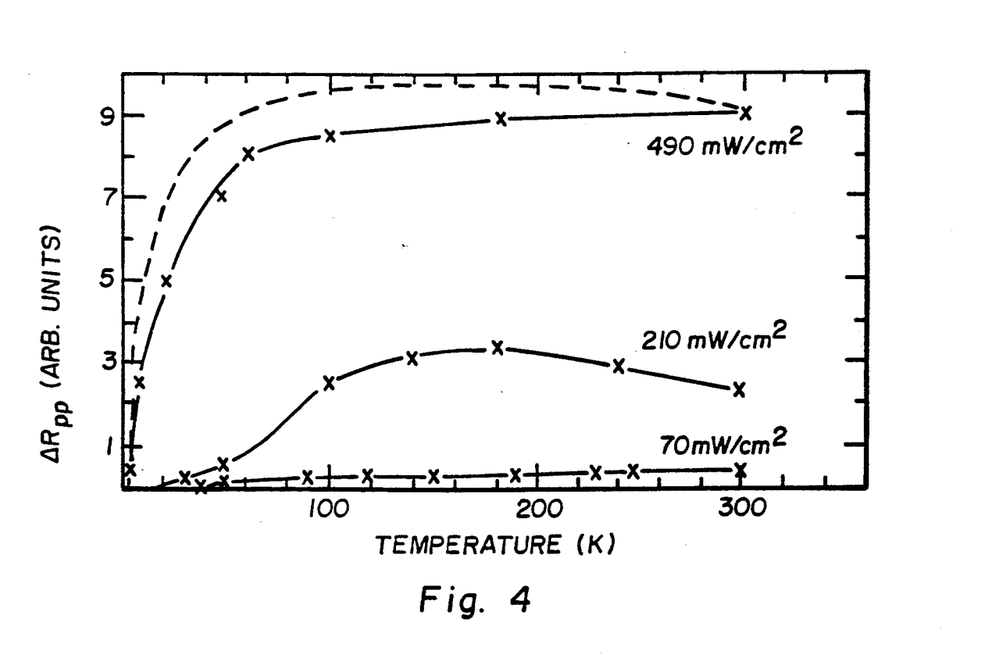
FIG. 4 is a graphical representation of measured temperature dependence of peak-to-peak amplitude of $\Delta R$ for three different values of the biasing light intensities (Example 1)

FIG. 4 sets forth graphically the measured temperature dependence of the peak-to-peak amplitude of ΔR of beam 110 for three different values of the biasing light intensity $I_a$ of beam 116, as shown, at 490 mW/cm², 210 mw/cm², and 70 mw/cm². The dashed line in FIG. 4 is a plot of $(dE_g/dT)_{T+(\Delta T)dc} (\Delta T)_{ac}$ where T is the ambient temperature, $(\Delta T)_{dc}$ is the dc or steady state component of sample temperature and $(\Delta T)_{ac}$ is the ac or modulated component of the sample temperature based upon a one-dimensioned model for $I_a = 490$ mw/cm². (See Thermal Modulation article.)

Figure 5:
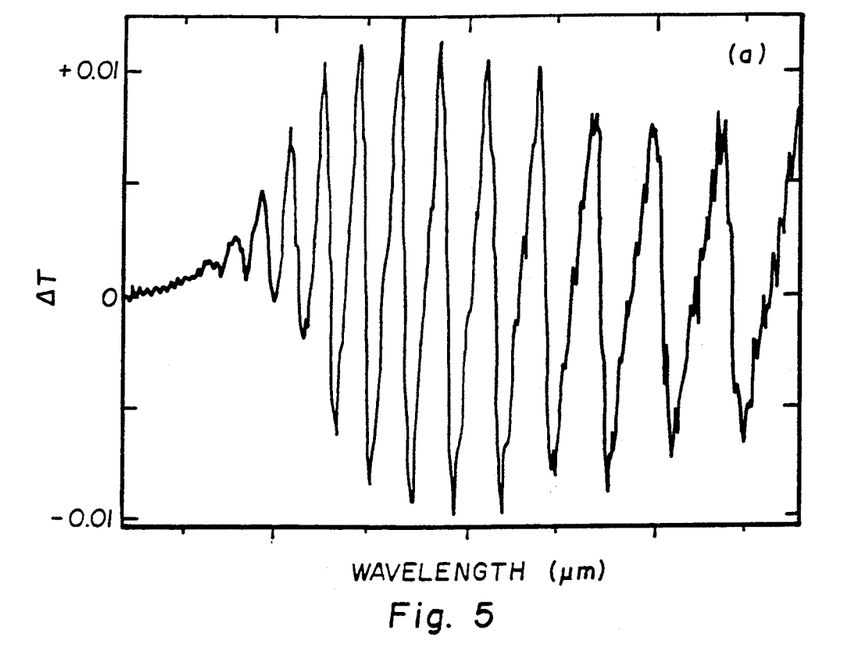
FIG. 5 is a graph of measured ΔT as a function of wavelength for a 3 μm-thick film of a-Si:H on glass (Example 1)

FIG. 5 illustrates the experimental ΔT of beam 112 measured for the 3 μm a-Si:H films. In films with low defect density, as was used in this case, the induced absorption Δα is usually never greater than 10 cm⁻¹. (See Thermal Modulation article.) An analysis of these results indicates that photoinduced absorption is negligible. (See Thermal Modulation article.) Even in films with higher defect densities, Δα has been inferred to be at most about 50 cm⁻¹ from measurements of T. (See Thermal Modulation article.)

Reliable values of Δα can be obtained only when Δn=0, a situation that is possible in the films and substrates used only at low temperatures and low excitation intensities. From the data of FIG. 3, n≈0 when $I_a < 70$ mW/cm² and T<50K. This is true for the case of thin films on glass substrates. Sapphire may be a better choice for substrates if thermal effects need to be minimized for photoinduced absorption measurements. The higher thermal conductivity of sapphire will help prevent large temperature rises of the film.

EXAMPLE 2

Figure 6:
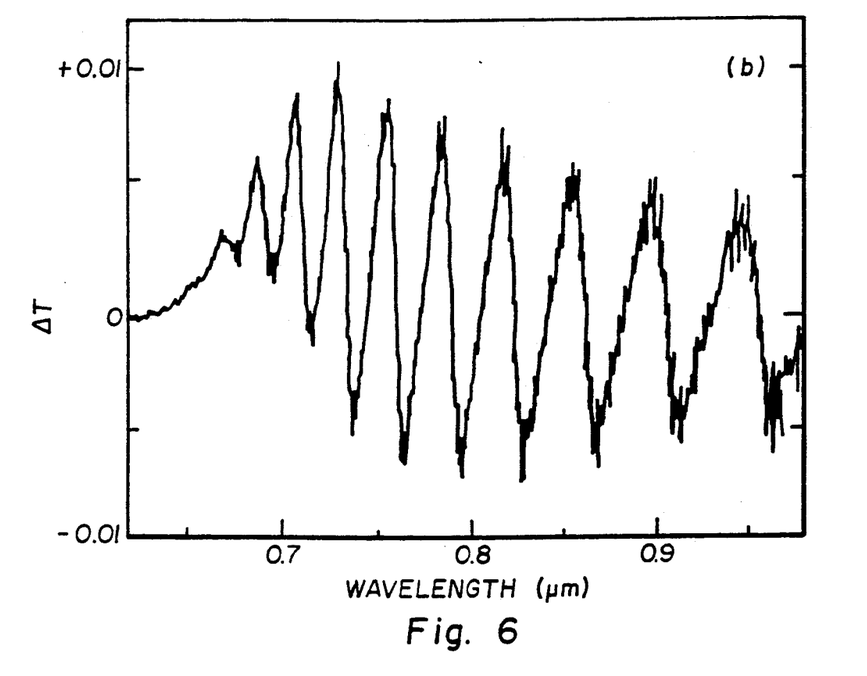
FIG. 6 is a graph of measured ΔT as a function of wavelength for a 3 μm-thick film of glassy As$_2$Se$_3$ on glass (Example 2)

FIG. 6 illustrates the measured ΔT spectrum of beam 112 at 300K for a thin film of $As_2Se_3$. Ordinary transmission spectra indicated that thickness variations were more important in the glassy $As_2Se_3$ film. These variations result in the fringe pattern being less sharp than would be expected for the ideal case. Although the qualitative features of the ΔT spectra in FIG. 6 are very similar for these two films, the spectrum for $As_2Se_3$ exhibits features due to variations in film thickness.

The signals in FIGS. 5 and 6 decay as one approaches the band gaps of a-Si:H and $As_2Se_3$ where a significant fraction of the incident light is absorbed in one pass through the film. The band gap of a-Si:H is typical for a material which has low defect density, but the band gap for the $As_2Se_3$ is not typical of the bulk glass because the film was made by rapid deposition on a 300K substrate.

EXAMPLE 3

In example 3, the physical arrangement was similar to that shown in FIG. 1. The transmission of probe beam 106 was monitored at a selected wavelength, as a function of the intensity of the optical pump beam 116. In Example 3, the pump beam 116 was not chopped. The intensity of pump beam 116 was slowly and continuously varied and the transmitted intensity of transmitted beam 112 was measured. Signals corresponding to the intensities of beams 116 and 112 were fed into a chart recorder.

Figure 7:
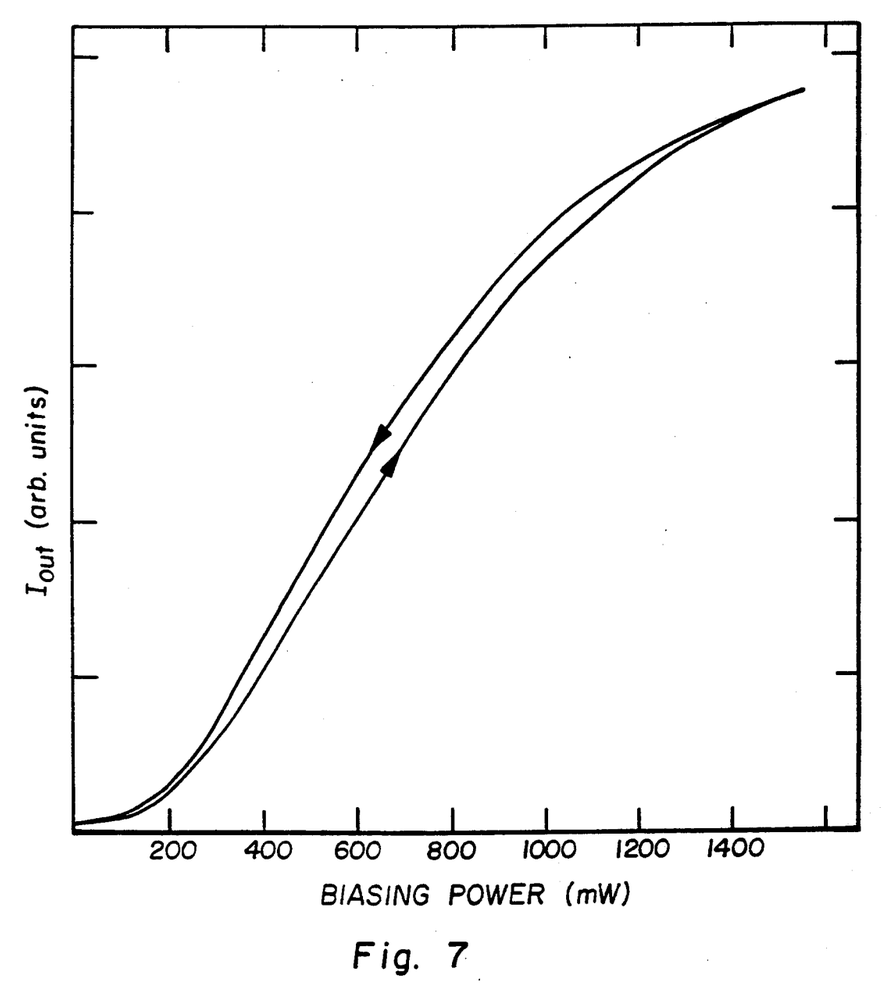
FIG. 7 is a graph of measured transmitted intensity of a probe beam at λ=7995 Å as a function of a biasing (pump) beam incident on the film (Example 3).

The results are shown in FIG. 7. The intensity of pump beam 116 is denoted as biasing power (x-axis) and the transmitted intensity of beam 112 is denoted as $I_{out}$, the output intensity. A hysteresis is observed on decreasing the pump intensity. FIG. 7 illustrates an optical transistor effect.

Figure 8:
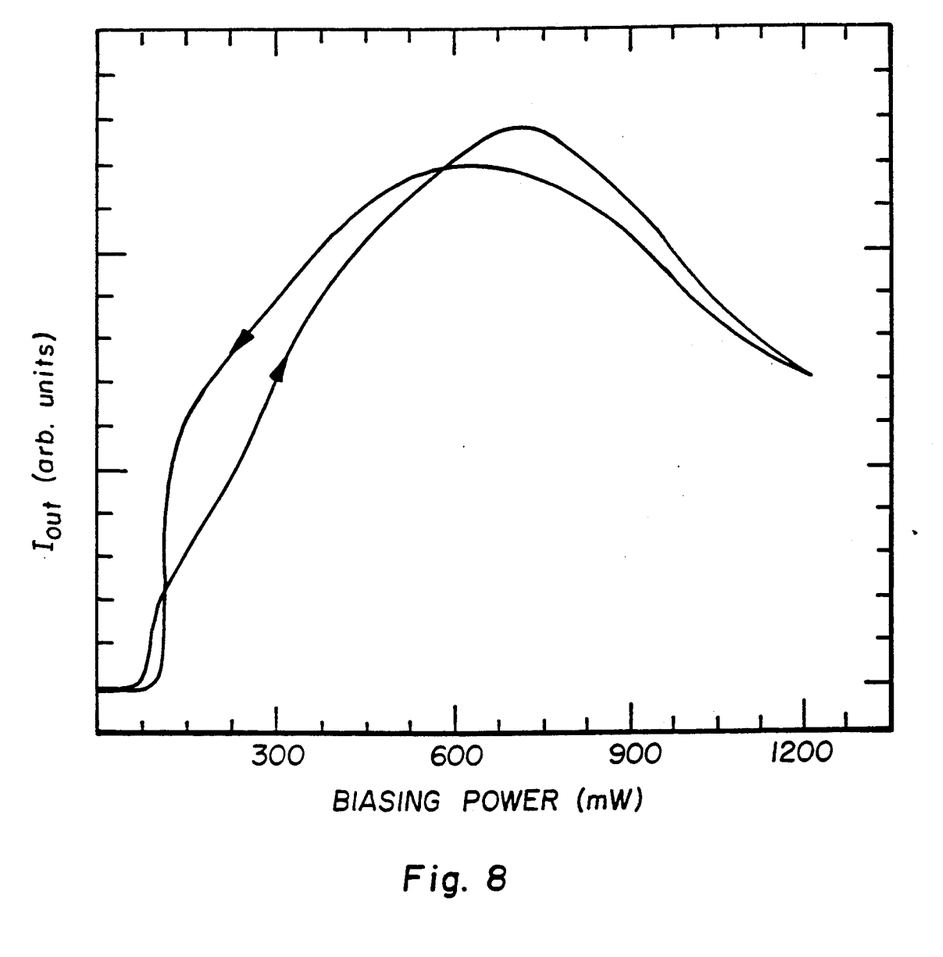
FIG. 8 is a graph of measured transmitted intensity of a probe beam at λ=13,000 Å as a function of the intensity of a biasing (pump) beam incident on the film (Example 3)

FIG. 8 illustrates the results of the same apparatus measured at a different wavelength λ=13,000 Å. As can be seen, varying λ produces a different shape. The y axis ($I_{out}$) is in arbitrary units because the intensity of the probe beam is at a level that it does not affect the optical properties of the medium.

Optical switching in amorphous semiconductors may be attributed to nonlinearity in the real part of the refractive index due to thermal effects. Below the band gap, the basis for a nonlinear n is the temperature variation of the band gap. Practically speaking, this property does not depend on wavelength in the spectral region of the band gap. Photostructural changes and thermal effects on k are not important in the band gap region in a-Si:H, thereby reducing the number of parameters required for quantifying the induced changes. Any amorphous semiconductor can be substituted for a-Si:H if different optical band gaps are required.

Semiconductors having band gaps of about 3 eV or less are currently considered preferred. However, semiconductors of high energy band gaps may be usable if high energy probe or pumps beam are feasible in the particular system used. The following are some typical amorphous semiconductors in the preferred usable band gap range.

| Semiconductor | Approximate Energy Band Gap $E_g$ (eV) |
|---|---|
| $As_2S_3$ | 2.2 |
| $As_2Se_3$ | 1.8 |
| Se | 1.6 |
| A-$Si_xGe_{1-x}$:H ($0 \leq x \leq 1$) | 1.0–1.8 (depending on x) |
| a-$Si_xC_{1-x}$:H ($0 \leq 1 \leq 1$) | 1.8 eV to greater than 3 eV (depending on x) |

EXAMPLE 4

Figure 9:
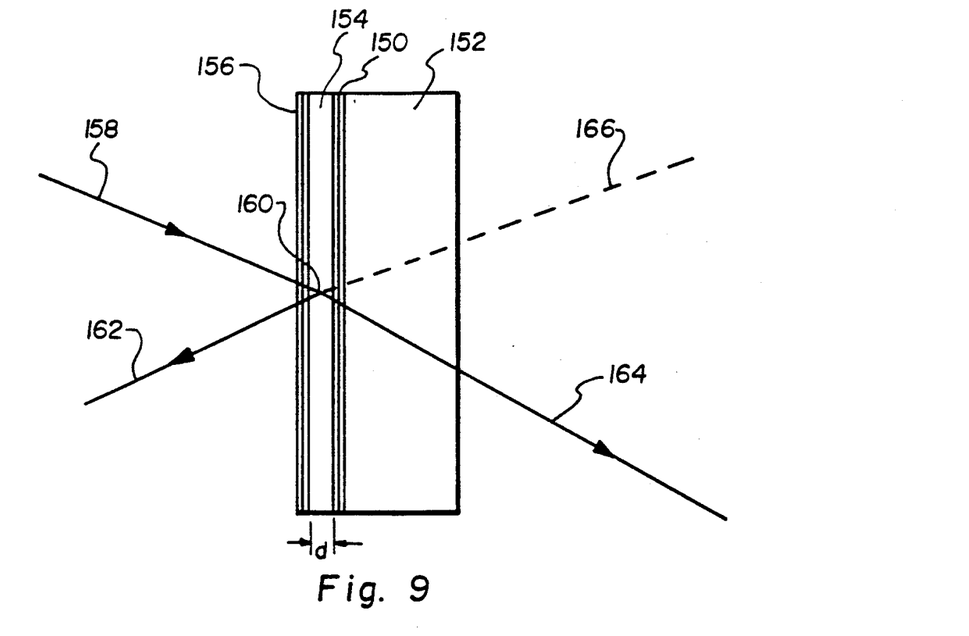
FIG. 9 is a schematic illustration of an alternative embodiment of an optically bistable device of the invention (Example 4)

FIG. 9 schematically illustrates Example 4 of an optically bistable device of the invention which is particularly adapted to optical switching. In FIG. 9, the device includes a multilayer dielectric mirror 150 deposited upon a glass substrate 152. A thin layer 154, similar to layer 100, of a-Si:H is positioned on mirror 150, and another multilayer dielectric mirror 156 is deposited upon layer 154. A probe beam 158 is preferably a laser beam, for example, a GaAs laser at approximately 1.4 eV. Beam 158 is incident upon layer 154 at region 160 and is reflected to a reflected beam 162 and transmitted to a transmitted beam 164. A pump beam 166 similar to beam 116 is also incident at region 160 of layer 154.

Optical switching is accomplished by causing the optically bistable device to quickly change between the output intensities, which may represent, for example, a logic 0 and a logic 1 condition in a logic device. The dielectric mirrors 150 and 156 increase the "finesse" of the device. In other words, they lower the power required for switching and increase the dynamic range of the switch. Dynamic range is the intensity of the transmitted beam in its high transmitting state (e.g. logic 1 condition) divided by the intensity of the transmitted beam in the low transmitting state (e.g. logic 0 condition). The switch preferably has a minimum dynamic range of about 2, but may have much higher values, such as 1000 or more.

Finesse can be increased by increasing R, the reflectivity at the interfaces of the Fabry-Perot chamber. An increase in reflectivity at the interfaces is accomplished by the dielectric coatings 150 and 156 between the substrate and the film, as shown, on the surface of the semiconducting film. The reflectivities of the mirrors and the film thickness are chosen to optimize the device according to procedures discussed by D. A. B. Miller: IEEE, OE-17, p. 306 (1981). The disclosure of this article is incorporated herein by this reference. Using these procedures, the parameters of the device of Example 4 are the following: (absorption coefficient)=100 $cm^{-1}$, R (reflectivity)=90–95%, d (a-Si:H film thickness)-=3–5 μm. Multilayer dielectric mirrors 150 and 156 contained approximately 10 alternating layers of titanium dioxide ($TiO_2$) and silicon dioxide ($SiO_2$). These layers were electron-gun evaporated onto substrate 152 and film 154. The base pressure of the evaporation chambers (Balzers BAK 600) before evaporation was greater than $10^{-5}$ mbar. In order to achieve absorption-free coatings, the layers were deposited in an oxygen atmosphere of general $10^{-4}$ mbar. The substrate 152 temperature was 300K. The coating process data were:

| Coating Materials | $TiO_2$ | $SiO_2$ |
|---|---|---|
| Oxygen Pressure [mbar] | $3 \times 10^{-4}$ | $1 \times 10^{-4}$ |

-continued

| Coating Materials | TiO$_2$ | SiO$_2$ |
|---|---|---|
| Deposition Rate [Å/sec] | 15 | 50 |
| Refractive Index [at 700 nm] | 2.30 | 1.45 |

Quarter-wave and half-wave optical thicknesses were optically monitored at 700 nm and adjusted to an accuracy of ±2%.

EXAMPLE 5

Figure 10:
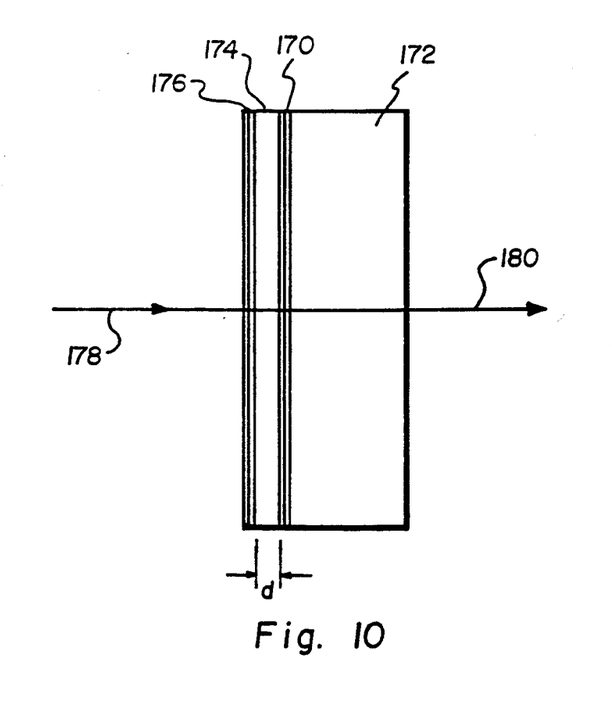
FIG. 10 is a schematic illustration of another alternative embodiment of an optically bistable device of the invention (Example 5).

Example 5 of an optically bistable device of the invention is illustrated in FIG. 10 as including a multilayer dielectric mirror 170 deposited upon a glass substrate 172, semiconducting layer 174, similar to layer 100, and multilayer dielectric mirror 176. In comparison to Example 4, only a single beam 178, preferably laser, similar to beam 158, at an energy below the band gap of layer 174 (e.g. GaAs laser) is incident upon layer 174 to produce a transmitted beam 180. In effect, the probe beam 178 also acts as the biasing or pump beam. As the intensity of beam 128 increases or decreases, the index of refraction of layer 124 will switch the transmitted beam 180 between its recognizable logic 0 or logic 1 conditions, respectively. The transmitted intensity of the probe beam traces a hysteresis curve as the intensity of the pump beam is increased or decreased (See S. D. Smith, Applied Optics, Supra. In Example 5, beam 178 may be divided into two components, a reading beam and a biasing or writing beam. Switching is accomplished by changing the intensity of the writing beam to trace the hysteresis curve of the output intensity versus biasing power. See, for example, the hysteresis curves shown in FIGS. 7 and 8.

The switch of Example 5 makes use of an increased finesse due to dielectric mirrors 170 and 176 and optical switching by a probe beam below the band gap of film 174. The switch of Example 5 thus makes use of the band gap tail of film 174. The switch of example 5 may be particularly commercially useful as a logic latching device, switched by pulses in intensity of beam 178.

Optically bistable devices of the invention may be used in an array configuration, for example, on a single film. One use of such an array would be as a memory device. The array may be scanned in rastor or multiplexed fashion to switch selected switches according to the needs of the system.

Reference herein to details of the illustrated embodiment is not intended to limit the scope of the appended claims, which themselves recite those features regarded a important to the invention.

We claim:

1. An optical switching system, comprising:
   a probe beam of electromagnetic radiation;
   a film of amorphous semiconductor material, said film being positioned to have a target area upon which said probe beam is incident and being configured and adapted to provide optical feedback to said probe beam and to reflect and transmit said probe beam;
   said probe beam being in energy less than the energy band gap of said amorphous semiconductor material; and
   a pump beam of electromagnetic radiation incident upon said target area having a preselected energy to thermally alter said amorphous material a sufficient amount to alter the transmission and reflection of said probe beam.

2. An optical switching system according to claim 1, further comprising internally reflective mirrors positioned on said film of amorphous semiconductor material.

3. An optical switching system according to claim 2, wherein said internally reflective mirrors are multilayer dielectric mirrors.

4. An optical switching system according to claim 1, wherein said probe beam and said pump beam are the same beam.

5. An optical switching system according to claim 1, wherein said pump beam is distinct from said probe beam.

6. An optical switching system according to claim 1, wherein said film of amorphous semiconductor material is amorphous silicon.

7. An optical switching system according to claim 6, wherein said amorphous silicon is hydrogenated.

8. An optical switching system, comprising:
   a probe beam of electromagnetic radiation;
   a Fabry-Perot chamber containing a layer of amorphous semiconductor material and internally reflective mirrors on either side of said layer, said Fabry-Perot cavity being positioned such that said probe beam is incident upon a target area of said amorphous semiconductor material and being configured and adapted to provide optical feedback to said probe beam and to reflect and transmit said probe beam;
   said probe beam having a maximum energy less than the energy band gap of said amorphous semiconductor material; and
   means for thermally altering said amorphous semiconductor material by electromagnetic radiation a sufficient amount to induce a change in the intensity of the beam reflected and transmitted from said Fabry-Perot chamber between a recognizable logic 0 and logic 1 condition.

9. An optical switching system according to claim 8, wherein said mirrors are multilayer dielectric mirrors adapted to increase the finesse of the switching of said optical switch.

10. An optical switching system according to claim 8, wherein said amorphous semiconductor is thermally altered by said probe beam.

11. An optical switching system according to claim 8, wherein said amorphous semiconductor is thermally altered by a pump beam distinct from said probe beam.

12. An optical switching system according to claim 8, wherein said amorphous semiconductor material is amorphous silicon.

13. An optical switching system according to claim 12, wherein said amorphous silicon is hydrogenated.

14. A method of altering the intensity of a transmitted probe beam comprising the steps of:
   providing a film of amorphous semiconductor material to have a target area;
   irradiating said target area with a probe beam having energy lower than the energy band gap of said amorphous semiconductor;
   multiply internally reflecting said probe beam within said layer of amorphous semiconductor;
   transmitting said probe beam from said layer of amorphous semiconductor;
   thermally altering said amorphous semiconductor material by means of electromagnetic radiation to alter the transmission of said probe beam between intensities representing a logic 0 and logic 1 condition.

15. An method according to claim 14, wherein said layer of amorphous semiconductor material is thermally altered by means of said probe beam.

16. A method according to claim 14, wherein said film of amorphous semiconductor material is formed of amorphous silicon.

17. A method according to claim 16, wherein said layer includes a preselected density of hydrogen in said amorphous silicon.

18. A method according to claim 14, wherein said probe beam is a laser beam.

* * * * *